(12) United States Patent
Hashem et al.

(10) Patent No.: US 7,452,007 B2
(45) Date of Patent: Nov. 18, 2008

(54) HYBRID THREADED CONNECTION FOR EXPANDABLE TUBULARS

(75) Inventors: Ghazi J. Hashem, Houston, TX (US); Lev M. Ring, Houston, TX (US); John R. Setterberg, Jr., Dallas, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 210 days.

(21) Appl. No.: 10/885,824

(22) Filed: Jul. 7, 2004

(65) Prior Publication Data
US 2006/0006647 A1    Jan. 12, 2006

(51) Int. Cl.
F16L 25/00 (2006.01)
F16L 35/00 (2006.01)
E21B 17/00 (2006.01)
E21B 23/00 (2006.01)

(52) U.S. Cl. .............. 285/333; 285/334; 285/391; 166/207; 166/242.6

(58) Field of Classification Search .............. 285/334, 285/333, 391; 166/207, 242.6; 411/307, 411/366.1, 366.3
See application file for complete search history.

(56) References Cited

U.S. PATENT DOCUMENTS

| | | | |
|---|---|---|---|
| 2,980,451 A | 4/1961 | Taylor et al. | 285/332.3 |
| 3,047,316 A | 7/1962 | Wehring et al. | 285/334 |
| 3,268,275 A * | 8/1966 | Laghlin | 175/325.2 |
| 3,989,284 A | 11/1976 | Blose | 285/332.2 |
| 4,244,607 A * | 1/1981 | Blose | 285/92 |
| 4,582,348 A * | 4/1986 | Dearden et al. | 285/148.19 |
| 4,629,222 A * | 12/1986 | Dearden et al. | 285/332.4 |
| 4,629,223 A * | 12/1986 | Dearden et al. | 285/334 |
| 4,648,627 A | 3/1987 | Reimert | 285/24 |
| 4,703,959 A | 11/1987 | Reeves et al. | 285/332.3 |
| 4,707,001 A | 11/1987 | Johnson | 285/332.3 |
| 4,822,081 A | 4/1989 | Blose | 285/334 |

(Continued)

FOREIGN PATENT DOCUMENTS

EP    0127560    1/1990

(Continued)

OTHER PUBLICATIONS

General Administrative and Export Office. Atlas Bradford Company. p. 1. (1970-1971).

(Continued)

Primary Examiner—James M Hewitt
Assistant Examiner—Jay R Ripley
(74) Attorney, Agent, or Firm—Howrey LLP

(57) ABSTRACT

An expandable threaded connection between segments of expandable tubulars. The present invention utilizes two complementary thread segments. The first segment of the threaded connection utilizes standard box and pin threads. In the second segment of the threaded connection, material is removed from the stab flank of the pin threads to reduce the standard width of the pin threads, while the box threads of the second segment are standard thread width. The use of the reduced thread width in the pin threads of the second segment allows for a loose fit between the pin threads of the second segment and the box threads of the second segment. The loose fit between the pin and box threads of the second segment allows radial and axial movement between those threads without causing disengagement of the threaded connection during the expansion process.

62 Claims, 4 Drawing Sheets

U.S. PATENT DOCUMENTS

| | | | | |
|---|---|---|---|---|
| 5,009,826 | A * | 4/1991 | Walker | 264/154 |
| 5,348,095 | A | 9/1994 | Worrall et al. | 166/380 |
| 5,415,441 | A | 5/1995 | Kilgore et al. | 285/322 |
| 5,427,418 | A | 6/1995 | Watts | 285/94 |
| 5,924,745 | A | 7/1999 | Campbell | 285/90 |
| 5,954,374 | A | 9/1999 | Gallagher et al. | 285/332 |
| 5,984,568 | A | 11/1999 | Lohbeck | 403/375 |
| 6,042,153 | A | 3/2000 | DeLange et al. | 285/55 |
| 6,112,818 | A | 9/2000 | Campbell | 166/384 |
| 6,123,368 | A | 9/2000 | Enderle | 285/334 |
| 6,155,613 | A * | 12/2000 | Quadflieg et al. | 285/334 |
| 6,270,127 | B1 | 8/2001 | Enderle | 285/334 |
| 6,273,474 | B1 | 8/2001 | DeLange et al. | 285/55 |
| 6,322,109 | B1 | 11/2001 | Campbell et al. | 285/92 |
| 6,409,175 | B1 * | 6/2002 | Evans et al. | 277/314 |
| 6,425,444 | B1 | 7/2002 | Metcalfe et al. | 166/387 |
| 6,454,013 | B1 | 9/2002 | Metcalfe | 166/382 |
| 6,457,532 | B1 | 10/2002 | Simpson | 166/380 |
| 6,510,896 | B2 | 1/2003 | Bode et al. | 166/276 |
| 6,511,102 | B2 * | 1/2003 | Krug et al. | 285/333 |
| 6,712,401 | B2 | 3/2004 | Coulon et al. | 285/331 |
| 7,107,663 | B2 | 9/2006 | Ellington et al. | 29/523 |
| 2002/0121372 | A1 * | 9/2002 | Cook et al. | 166/250.07 |
| 2003/0067166 | A1 * | 4/2003 | Sivley, IV | 285/333 |
| 2003/0234538 | A1 | 12/2003 | Hashem | 285/333 |
| 2004/0104575 | A1 * | 6/2004 | Ellington et al. | 285/333 |

FOREIGN PATENT DOCUMENTS

| | | |
|---|---|---|
| EP | 1106778 | 6/2001 |
| EP | 1203909 | 5/2002 |
| GB | 2361724 | 10/2001 |
| GB | 2394236 | 4/2004 |
| WO | WO98/42947 | 3/1998 |
| WO | WO01/04520 | 1/2001 |
| WO | WO01/18353 | 3/2001 |

OTHER PUBLICATIONS

Robert E. Snyder. "How Shell Completes Deep Smackover Sour Gas Wells". pp. 85-88. (Oct. 1971).

Scott et al. "VAM-PRO A Premium That Cuts Rig Operational Costs," *World Oil*, pp. 103-146 (Oct. 1995).

Scott, et al. "2002 Tubing Reference Tables," *World Oil*, pp. T-3-T-10 (Jan. 2002).

Hydril Series 500. "The Wedge Thread". Hydril Tubular Products Division. pp. 1-5.

Rucker/Atlas Bradford; *Tubing String Design Manual* 9 pages (Revised Jul. 1972).

Examination Report, App. No. GB0511043.2, UK Patent Office, Aug. 22, 2005.

Examination Report, App. No. 2,510,448, Candian Patent Office, Dec. 6, 2006.

Examination Report, App. No. 2,510,448, Candian Patent Office, Apr. 8, 2008.

* cited by examiner

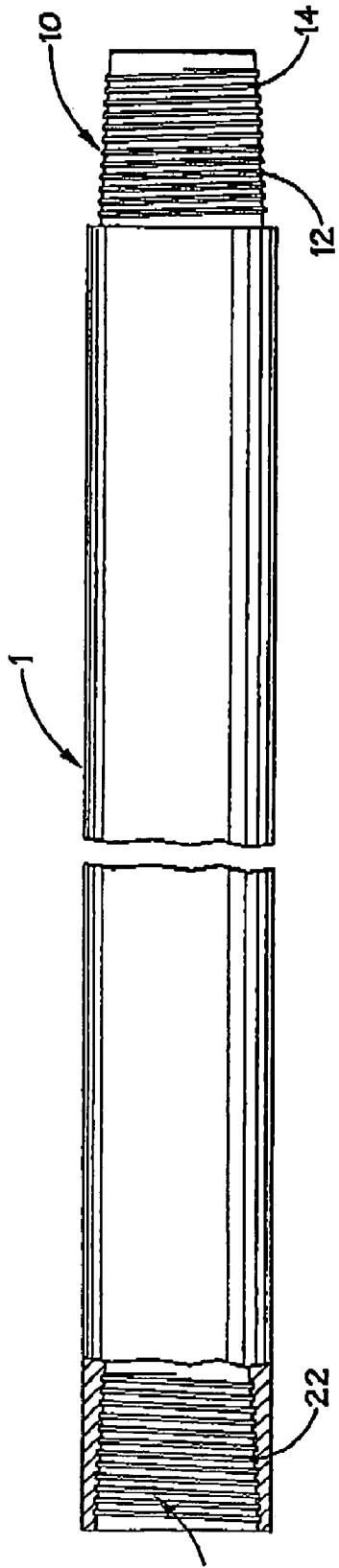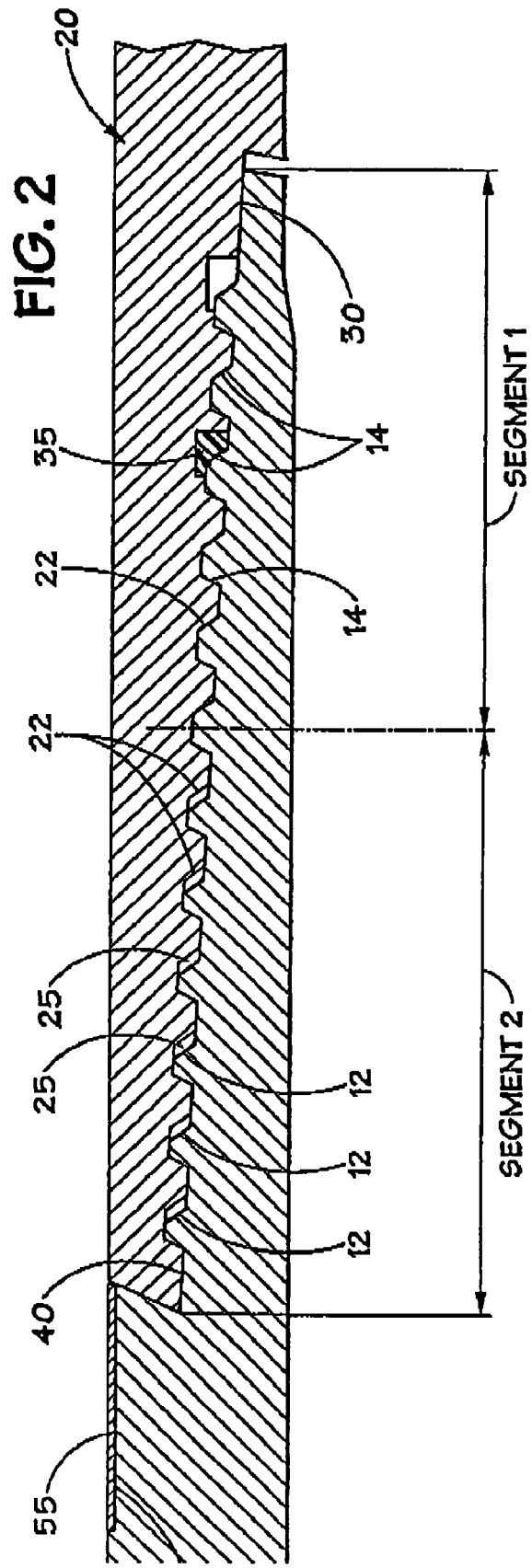

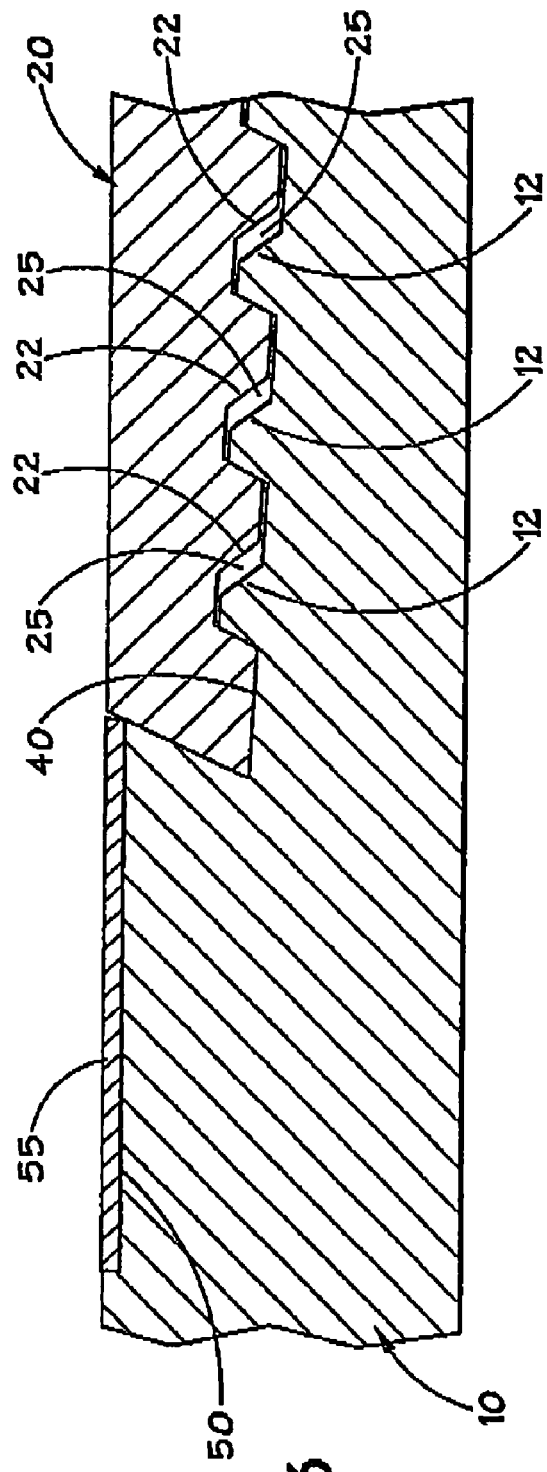
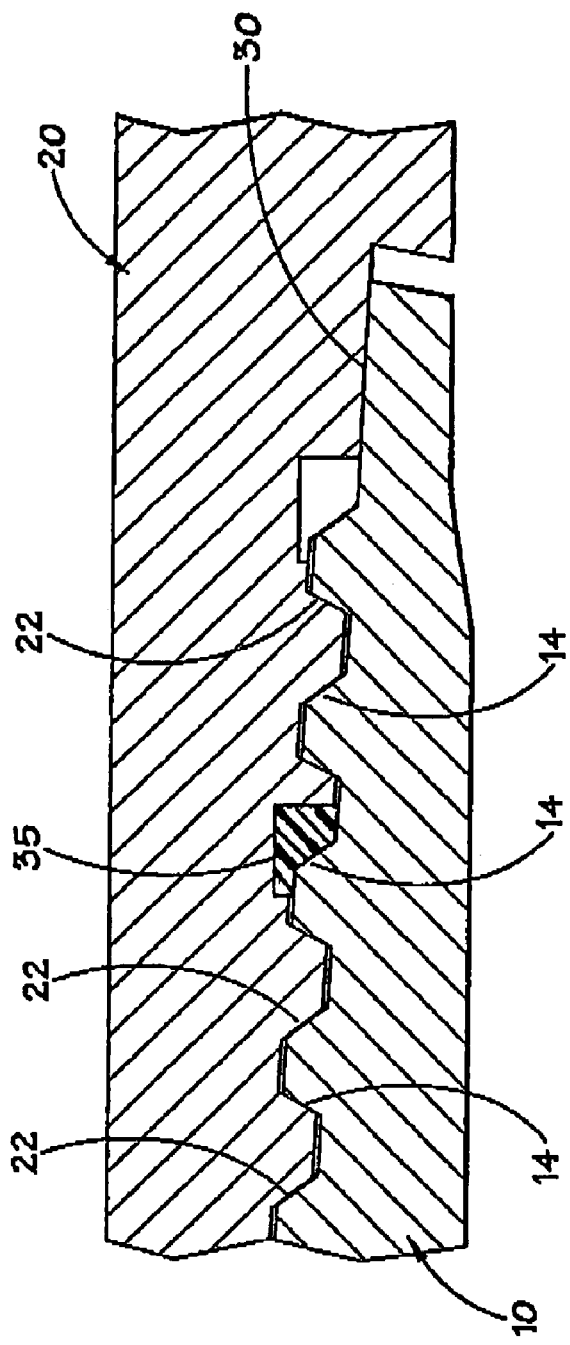
FIG. 3
FIG. 4

HYBRID THREADED CONNECTION FOR EXPANDABLE TUBULARS

FIELD OF THE INVENTION

The present invention relates to threaded tubular connections particularly useful in the oil and gas industry. In particular, the invention relates to an expandable tubular threaded connection having a unique hybrid thread design.

BACKGROUND OF THE INVENTION

In the conventional drilling of an oil and gas well, a series of tubulars, typically strings of casing, liner, and/or screen segments connected together, are sequentially installed in the well bore until the depth of the producing zone of the formation is reached. Standard practice requires that each succeeding string of tubulars placed in the well bore has an outside diameter smaller than the preceding string of tubulars and/or bore hole such that the tubular segments can be passed through the preceding string of tubulars and/or bore hole to their downhole location. The reduction in the diameter of each successive string of tubular segments placed in the well bore results in a significant reduction in the diameter of the tubular through which hydrocarbons can be carried to the surface. More importantly, to achieve the desired tubular diameter in the producing zone, the initial bore hole size at the surface must be sufficiently large to allow for a large diameter casing. The large initial bore hole size requires increased drilling time and increased material costs, including increased use of materials such as drilling mud and casing cement.

The technology of expandable tubulars addresses these shortcomings in the conventional casing/liner/screen hanging operations. Technology that allows the permanent expansion of tubulars in oil and gas wells is rapidly developing. Through radial expansion of tubular segments until the outer wall of those segments contacts the inner wall of the host pipe, it is possible to create a tight fit between the expandable tubulars and the host pipe that holds the tubular segments in place and creates an annular seal. Further, it is possible to achieve a well bore of virtually uniform diameter (i.e., a monobore well) by the radial expansion of successive strings of tubular segments. The expandable tubulars are radially expanded by various means known in the art, including, but not limited to, pulling or pushing fixed or variable diameter expansion cones through the tubular, extruding the tubular off of a hydraulically-actuated expansion tool, or rotating an expansion tool while pulling or pushing it through the tubular.

The tubular segments to be expanded are typically coupled together using threaded connections in which the male end, or pin member, of one tubular is threadably connected to the female end, or box member, of an adjacent tubular. Alternatively, the ends of the adjacent tubulars may have a pin member at each end, with the box member being formed by a short coupling threaded onto one of the pin members. When a conventional threaded connection is made up, the nose of the pin member is typically in contact with or very close to the back of the box member. This threaded engagement between properly secured pin and box members creates a conventional tubular joint that effectively maintains a secure mechanical connection that holds the tubular segments together and that effectively seals the internal tubular area from the formation and vice versa. Often, the sealing ability of the threaded engagement is augmented through the use of Teflon® rings or other deformable seal rings entrapped in the thread area as well as the metal-to-metal seal formed by the contact between the pin and box members.

Problems have arisen, however, at the threaded connection point between tubular segments during and after expansion when using conventional threaded tubular connections and seals currently available in the industry. When the tubular string is radially expanded, a conventional threaded connection changes dimensionally in a way that can prevent the pin and box members from maintaining proper engagement and sealing. The radial expansion of a conventional threaded connection can cause the pin and box members to radially separate. Essentially, because the radius of curvature of the pin member is different than the radius of curvature of the box member during the expansion process, the pin and box members experience different displacements that the threads of a typical threaded connection cannot accommodate. As a result, the radial expansion weakens the coupling strength of the connections and degrades or lowers the pressure holding integrity of the connections. The threaded connection point thus becomes a source of potential weakness in the tubing string and of potential leaks during and after expansion of the tubular string.

Additionally, the radial expansion of the tubular string causes the pin and box members to undergo axial movement. The amount of axial movement experienced by the pin and box members is dependent on numerous factors, including, but not limited to, the amount of radial expansion of the tubular string, the geometry of the threaded connection (e.g., whether the pin and box members have any thin wall sections), and the method of radial expansion employed.

As deeper wells and more difficult completions are attempted using expandable tubulars, the threaded connections that hold the expandable tubulars together must address these known problems and must be able to accommodate the higher pressures faced in such applications. What is needed is a threaded connection for expandable tubulars that maintains the coupling strength and the pressure integrity of the connection so that it will withstand high pressure during and after expansion. It is an object of the present invention to provide an apparatus and method for creating a threaded connection between segments of expandable tubulars that maintains the coupling strength and the pressure integrity of the expanded connection during and after expansion. Those and other objectives will become apparent to those of skill in the art from a review of the specification below.

SUMMARY OF THE INVENTION

An expandable threaded connection between segments of expandable tubulars that allows the threaded tubular connection to withstand the stresses and deformations imposed on the connection by the tubular expansion process is disclosed. The present invention is a unique hybrid threaded connection that utilizes two complementary thread segments to form the expandable threaded connection. The first segment of the threaded connection encompasses the area of the threaded connection between the back of the box member and approximately the mid-point of the threaded connection. The first segment of the threaded connection utilizes standard box and pin threads such that the threads on the pin member in the area of the first segment fully engage the mating threads on the box member in the area of the first segment. Additionally, the first segment of the threaded connection comprises a radial metal-to-metal seal, a resilient seal, and a thread seal. All of these seals are fully activated upon make-up of the threaded connection.

The second segment of the threaded connection begins where the first segment ends (i.e., at approximately the midpoint of the threaded connection) and extends to the face of the box member. The second segment of the threaded connection has the threads machined on the pin member in a manner such that the pin thread width is reduced. In machining the threads of the pin member in the area of the second segment, material is removed from the stab flank of the pin threads to reduce the standard width of the pin threads. In contrast to the pin threads of the second segment, the box threads of the second segment are standard thread width and, thus, are the same thread width as the box threads in the first segment.

The use of the reduced thread width in the pin threads of the second segment allows for a loose fit between the pin threads of the second segment and the box threads of the second segment. As the threaded connection is expanded, the loose fit between the pin and box threads of the second segment allows radial and axial movement between the pin and box threads of the second segments of the threaded connection without causing disengagement of the threaded connection. Thus, the disclosed hybrid threaded connection utilizes multiple thread segments in which the second thread segment accommodates the stresses and deformations generated by the radial expansion process while the threads of the first segment maintain pressure integrity where the metal to metal seal, the resilient seal, and the thread seal are all fully engaged upon make-up of the threaded connection.

Additionally, in the preferred embodiment the disclosed threaded connection utilizes a sleeve in the area of the back of the pin member that is placed onto a machined land that is machined into the outer diameter of the pin member. When placed on this land, the sleeve has an outer diameter substantially the same as the outer diameter of the box member such that upon make-up of the threaded connection, the sleeve abuts the box member. The use of such a sleeve protects the face of the box member from being damaged during running-in of the tubular string.

BRIEF DESCRIPTION OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 1 is a side view of an expandable tubular with pin and box threads machined into the expandable tubular.

FIG. 2 is a side view of a hybrid threaded connection for expandable tubulars showing the first and second thread segments according to one embodiment of the present invention.

FIG. 3 is a close up view of the pin and box threads of the second segment of the hybrid threaded connection of FIG. 2 according to one embodiment of the present invention.

FIG. 4 is a close up view of the pin and box threads of the first segment of the hybrid threaded connection of FIG. 2 according to one embodiment of the present invention.

DESCRIPTION OF ILLUSTRATIVE EMBODIMENTS

Figure 5:
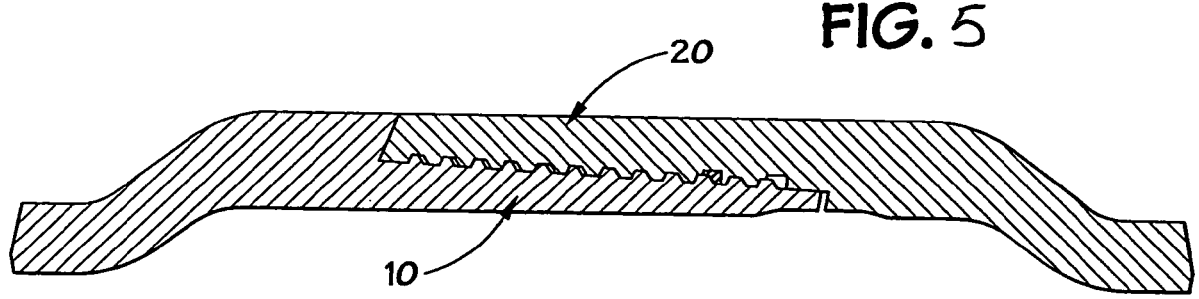
FIG. 5 is a side view of a hybrid threaded connection for expandable tubulars showing the first and second thread segments according to an alternative embodiment of the present invention in which the hybrid threaded connection is machined on pre-expanded tubular ends.

The following examples are included to demonstrate preferred embodiments of the invention. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments that are disclosed and still obtain a like or similar result without departing from the spirit and scope of the invention.

Referring to FIG. 1, an expandable tubular 1 is shown. In the typical application, multiple expandable tubulars 1 are connected together and sequentially installed in the well bore until the depth of the producing zone of the formation is reached. To accomplish this, expandable tubular 1 includes pin member 10 and box member 20. Pin member 10 includes helical threads 12 and 14 extending along its length as discussed in more detail with reference to FIGS. 2 and 3. Box member 20 includes helical mating threads 22 that are shaped and sized to mate with helical threads 12 and 14 on pin member 10 during make-up of a threaded connection between separate tubular joints or segments. The interengaged threads of pin member 10 with the corresponding threads of box member 20 on an adjacent joint provide a threaded connection upon final make-up. In this way, multiple segments of expandable tubulars can be threadably connected.

The helical threads can be machined on plain end tubulars, tubulars with both ends upset, tubulars with one plain end and one upset end, or other connection types as typically used in the oil and gas industry. Additionally, the helical threads can be selected from a broad range of thread types used in the industry. One of skill in the art can appreciate that the present invention is not limited in application to only certain kinds of tubular ends or thread types.

FIG. 2 is a side view of the hybrid threaded connection for expandable tubulars 11 of the present invention. As can be seen in FIG. 2, the hybrid threaded connection utilizes two complementary thread segments, Segment 1 and Segment 2, to form the threaded connection. In Segment 1, the pin threads 14 are sized and shaped to fully engage the box threads 22 upon make-up of the threaded connection. In contrast, in Segment 2, the pin threads 12 are specially machined to have a reduced thread width such that when the connection is made-up, the pin threads 12 do not fully engage the box threads 22. The result is the creation of a small gap 25 between the stab flank of the pin threads 12 and the adjacent flank of the box threads 22. This small gap 25 allows radial and axial movement between the pin and box threads of Segment 2 without causing disengagement of the threaded connection as the connection is expanded.

In the preferred embodiment of the present invention, the pin threads 12 of Segment 2 are machined on the pin member 10 in a manner such that the pin thread width is reduced by approximately one-third of the original, standard thread width. In machining the pin threads 12 in the area of Segment 2, material is removed from the stab flank of the pin threads 12 to reduce the standard width of the pin threads 12. In contrast to the pin threads 12 of Segment 2, the box threads 22 of Segment 2 are standard thread width and, thus, are the same thread width as the box threads 22 in Segment 1.

Although the width of the pin threads 12 of Segment 2 is reduced by approximately one-third of standard width in the preferred embodiment, one of skill in the art will appreciate that the pin thread width may be reduced by more than one-third or less than one-third of the standard thread width depending on numerous factors, including, but not limited to, the geometry of the expansion tool performing the tubular expansion, the amount of bending experienced by the threaded connection, the wall thickness of the expandable tubulars, the grade of material used for the expandable tubulars, and the percent expansion of the tubulars.

Figure 7:
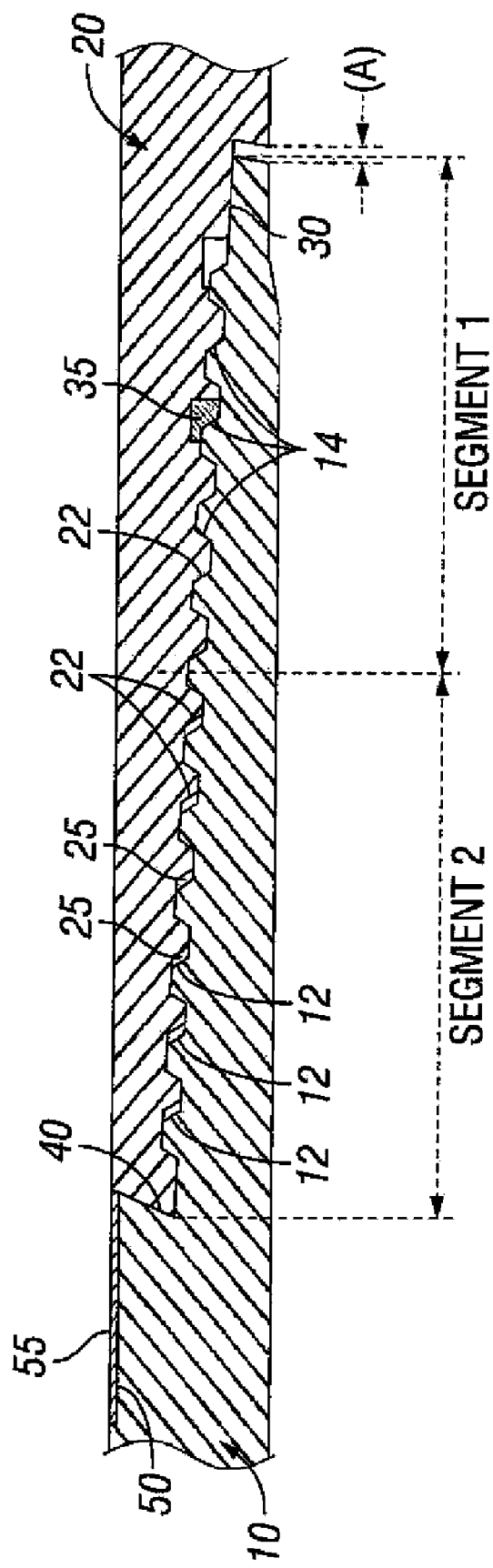
FIG. 7 is a side view of a hybrid threaded connection for expandable tubulars showing a box member having a first and second thread segments according to one embodiment of the present invention.

Additionally, one of skill in the art will appreciate that alternative embodiments exists in which the pin threads may be of a uniform width across the entire length of the pin member 10 while the box threads of the box member 20 may be machined such that the box member 20 has multiple thread segments, including a thread segment wherein the box threads have a reduced thread width such that a gap is formed between the stabbing flank of the pin threads and the adjacent flank on the box threads, for accomplishing the objectives of the present invention. Such an alternative embodiment is illustrated in FIG. 7.

Further, although the preferred embodiment utilizes a pin member 10 comprising two thread segments, one of skill in the art will appreciate that alternative embodiments exist in which a pin member (or box member) with more than two thread segments having varying thread widths may be used to accomplish the objectives of the present invention. Moreover, although the preferred embodiment utilizes threads of a uniform width reduction in Segment 2 of either the pin or box member, one of skill in the art will appreciate that the threads of Segment 2 of either the pin member or the box member could be cut such that the reduction in width of the threads progressively increases (i.e., the threads could be cut at an accelerating lead resulting in each "shaved" thread having a slightly smaller width than the preceding thread).

FIG. 2 also shows the four-point seal that is created in the disclosed threaded connection upon make-up of the connection. Specifically, upon make-up of the disclosed threaded connection, radial metal-to-metal seals 30 and 40 will be created by the area of engagement between the pin member 10 and the box member 20 as shown in FIG. 2, while the engagement of pin threads 14 and box threads 22 in the area of Segment 1 will also create a "thread seal." Additionally, a resilient seal ring 35, such as a Teflon® ring, may be placed in a groove between the pin and box threads in Segment 1. The use of a resilient seal ring 35 augments the sealing capacity of the threaded connection. The resilient seal ring 35 can be selected from any suitable downhole sealing material known in the industry, and can be shaped and sized to effect the greatest possible sealing arrangement. Thus, as shown in FIG. 2, the disclosed hybrid threaded connection utilizes multiple thread segments, Segments 1 and 2, in which the threads of Segment 2 accommodate the stresses and deformations generated by the radial expansion process while the threads of Segment 1 maintain pressure integrity where the metal-to-metal seal 30, the resilient seal ring 35, and the seal between engaged threads 14 and 22 are all fully activated upon make-up of the threaded connection.

FIG. 2 also discloses the use of a sleeve 55 that resides on a machined land 50 that is machined into the outer diameter of the expandable tubular 1 adjacent the pin member 10. In the preferred embodiment, the sleeve 55 has an outer diameter substantially identical to the outer diameter of the box member 20 and abuts up against, but does not cover, the end of box member 20. The benefits of utilizing sleeve 55 on machined land 50 are discussed in more detail below with reference to FIG. 3.

FIG. 3 is a close up view of the pin threads 12 and the box threads 22 of Segment 2 of the hybrid threaded connection of FIG. 2. FIG. 3 shows the gap 25 created by the engagement of the box threads 22 with the reduced width pin threads 12 in more detail.

FIG. 3 also shows the use of sleeve 55 on machined land 50 in more detail. In the preferred embodiment, box member 20 is machined on an area of the expandable tubular 1 that has a slightly larger outer diameter than the remaining portion of the expandable tubular 1. The outer diameter of the box member 20 is then "turned down" to the desired outside diameter—which is slightly larger than the outside diameter of the pin member 10 in the preferred embodiment. This special turned down box member 20 will allow for a better inspection of the box member 20 by different methods of non-destructive testing. The pin member 10 is machined on the other end of the expandable tubular 1 such that the outside diameter of the pin member 10 is the same as that of the expandable tubular 1 outside diameter.

Machined land 50 is machined into the outer diameter of the expandable tubular 1 such that sleeve 55 can be secured on the pin end of the expandable tubular 1 on the machined land 50 by a shrink fit method or any other suitable method such as the use of epoxy compounds. Machined land 50 extends from the external shoulder of pin member 10 to a point on the expandable tubular 1 that is approximately 2.0 inches from the threaded connection. One of skill in the art will appreciate that the length of machined land 50 can be greater than or less than 2.0 inches and still achieve the objectives of the present invention. In the preferred embodiment, sleeve 55 has an outside diameter equal to that of box member 20. Sleeve 55 can be made of steel or other suitable material, including resilient materials.

During the running in of the tubular string in a well, the pin member 10 will be run in the "pin up" position, i.e., the position in which the pin nose is pointing towards the surface of the well. This is done to facilitate the movement of the expansion cone or tool through the threaded connection as is customary with such applications. In this position, box member 20 will be facing downward. Because the outside diameter of box member 20 is slightly larger than the outside diameter of pin member 10, it is possible that box member 20 may get "hung up" or damaged during the running in of the tubular string. Such damage can weaken the connection, as most expandable tubulars are thin-walled. Because the sleeve 55 outside diameter is machined to equal that of the box member 20 outside diameter, the sleeve 55 serves to protect the exposed end of the box member 20, thus reducing or eliminating the risk of damaging the face of the box member 20 while running the string inside the host tubular or borehole.

Moreover, because sleeve 55 is not designed to cover box member 20, sleeve 55 does not increase the effective wall thickness of box member 20 and, thus, does not affect the expansion capabilities of the tubular in the area of box member 20 and does not interfere with the metal-to-metal contact between a host pipe and an expanded tubular. Although sleeve 55 is used in the preferred embodiment of the present invention, one of skill in the art will appreciate that alternative embodiments of the present invention may not use sleeve 55 or machined land 50.

FIG. 4 is a close up view of the pin threads 14 and the box threads 22 of Segment 1 of the hybrid threaded connection of FIG. 2. As FIG. 4 shows, the pin threads 14 of Segment 1 are standard width such that they fully engage the box threads 22 in the area of Segment 1. FIG. 4 also shows the metal-to-metal seal 30 and resilient seal 35 that are created or are functional when threads 14 and 22 are fully engaged upon make-up of the threaded connection.

In an alternative embodiment of the present invention shown in FIG. 5, pin threads 12 and 14 and box threads 22 could be machined on pre-expanded ends of expandable tubulars to reduce the amount of expansion of the connection versus the amount of expansion of the tubular itself. The use of pre-expanded ends on expandable tubulars is disclosed and claimed in U.S. patent application Ser. No. 10/442,859 filed on May 21, 2003 (which is incorporated herein in its entirety).

Figure 6:
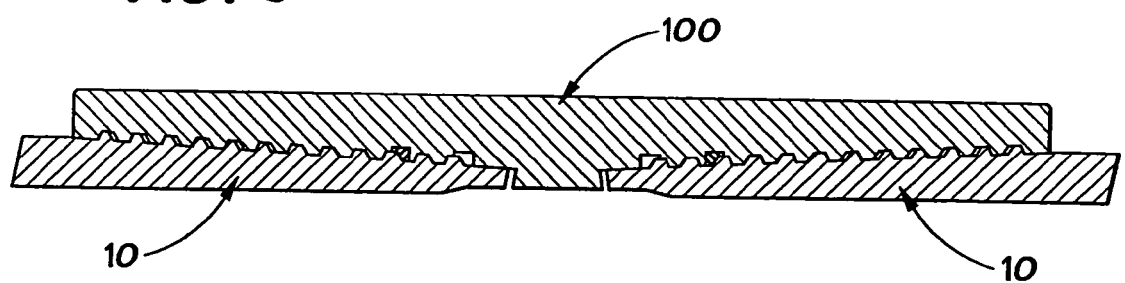
FIG. 6 is a side view of a hybrid threaded connection for expandable tubulars showing the first and second thread segments according to an alternative embodiment of the present invention in which the hybrid threaded connection is made up using a separate coupling member.

In another alternative embodiment of the present invention shown in FIG. 6, pin members 10 could be machined on both ends of the expandable tubulars 1 such that a coupling member 100 is used to form a threaded and coupled connection. In such a connection, coupling member 100 would serve as the box members 20 with box threads 22 that would engage pin threads 12 and 14 consistent with the teachings of the present invention. Generally, the inside diameter of coupling member 100 will be machined to equal that of the expandable tubular 1 inside diameter to facilitate the transition of the expansion tool through the expandable tubular 1 during the expansion operation. Although the coupling member 100 shown in FIG. 6 is shown as a double box member coupling, one of skill in the art will appreciate that coupling member 100 is not limited to such a configuration and could be any configuration that allows for threadably coupling two expandable tubulars together with pin threads 12 and 14 and box threads 22 as disclosed herein.

Further, during the expansion operation, a solid cone of suitable material such as hardened steel, machined to exact dimensions, is pulled through the expandable tubulars and the threaded connections in the preferred embodiment. One of skill in the art will appreciate, however, that this is not the only applicable expansion method that can be applied to expand the present invention. For example, the expansion cone could be pushed through the expandable tubular rather than being pulled through, the expansion operation could be performed using a rotary expansion method, or the expansion operation could be performed using a combination of such methods in either a single or multiple pass expansion operation.

Similarly, one of skill in the art will appreciate that the expansion cone or expansion tool itself could be of different designs depending on the size and grade of the material to be expanded and the desired results. For example, the expansion cone could be a "bullet" shape, a sphere, or a combination of such shapes. Further, the expansion cone or expansion tool could be either solid or a hollow "shell," or could be a "shell" filled with a different material than that of the shell itself.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

The invention claimed is:

1. An expandable threaded tubular connection comprising:
    a first tubular segment with a box member, the box member comprising interengageable threads that have load flanks and stab flanks of a constant pitch; and
    a second tubular segment with a pin member, the pin member comprising interengageable threads for engaging said box member, the interengageable threads of the pin member having a first thread segment and a second thread segment, the first and second thread segments comprising multiple turns of threads,
    wherein the first thread segment comprises load flanks and stab flanks of a first pitch, the first pitch being constant across the first thread segment,
    wherein the second thread segment comprises load flanks and stab flanks of a second pitch, the second pitch being constant across the second thread segment, the threads of the second thread segment having a reduced axial thickness relative to the threads of the first thread segment,
    wherein the first and second pitch is equal to the pitch of the threads of the box member, and
    wherein the load flanks of the first and second thread segments are fully engaged with the load flanks of the box member upon makeup of the connection.

2. The expandable threaded tubular connection of claim 1 wherein the first thread segment comprises the portion of the pin member from the pin nose end to approximately the midpoint of the pin member.

3. The expandable threaded tubular connection of claim 2 wherein the second thread segment comprises the portion of the pin member from approximately the midpoint of the pin member to an external shoulder of the pin member.

4. The expandable threaded tubular connection of claim 3 wherein the reduced axial thickness of the threads of the second thread segment of the pin member causes a gap to be formed between the stab flank of the pin threads and the adjacent flank of the box threads when the threads of the second thread segment are engaged with the corresponding mating threads of the box member upon make-up of the threaded connection.

5. The expandable threaded tubular connection of claim 4 wherein the gap allows radial and axial movement between the pin threads of the second thread segment and the corresponding mating box threads during radial expansion of the threaded connection.

6. The expandable threaded tubular connection of claim 5 wherein the axial thickness of the pin threads of the second thread segment is reduced by one-third.

7. The expandable threaded tubular connection of claim 5 wherein the axial thickness of the pin threads of the second thread segment is reduced by less than one-third.

8. The expandable threaded tubular connection of claim 5 wherein the axial thickness of the pin threads of the second thread segment is reduced by more than one-third.

9. The expandable threaded tubular connection of claim 1 wherein the outside diameter of the box member is greater than the outside diameter of the pin member.

10. The expandable threaded tubular connection of claim 9 further comprising a machined land area in the outside diameter of the second tubular extending from an external shoulder of the pin member to a point on the second tubular that is two inches from the external shoulder.

11. The expandable threaded tubular connection of claim 10 further comprising a sleeve secured around the second tubular on the machined land area, the sleeve having an outside diameter substantially equal to the outside diameter of the box member.

12. The expandable threaded tubular connection of claim 11 wherein the sleeve is a non-metallic material.

13. The expandable threaded tubular connection of claim 11 wherein the sleeve abuts the end of the box member upon make-up of the threaded connection.

14. The expandable threaded tubular connection of claim 11 wherein the sleeve is metal.

15. The expandable threaded tubular connection of claim 9 further comprising a machined land area in the outside diameter of the second tubular extending from an external shoulder of the pin member to a point on the second tubular that is less than two inches from the external shoulder.

16. The expandable threaded tubular connection of claim 9 further comprising a machined land area in the outside diameter of the second tubular extending from an external shoulder of the pin member to a point on the second tubular that is greater than two inches from the external shoulder.

17. The expandable threaded tubular connection of claim 1 further comprising a radial metal-to-metal seal formed by the engagement of the box member with the pin member in the area of the first thread segment of the pin member upon make-up of the threaded connection.

18. The expandable threaded tubular connection of claim 17 further comprising a thread seal formed by the engagement of the box threads with the pin threads of the first thread segment upon make-up of the threaded connection.

19. The expandable threaded tubular connection of claim 18 further comprising a resilient sealing ring placed in a groove within the first thread segment, the resilient sealing ring forming a seal upon make-up of the threaded connection.

20. An expandable threaded tubular connection comprising:
   a first tubular segment with a box member, the box member comprising interengageable threads that have load flanks and stab flanks of a constant pitch;
   a second tubular segment with a pin member, the pin member comprising interengageable threads for engaging said box member, the interengageable threads of the pin member having a first thread segment and a second thread segment, the first and second thread segments comprising multiple turns of threads,
   wherein the threads of the first thread segment of the pin member fully engage corresponding mating threads on the box member upon make-up of the threaded connection,
   wherein the threads of the second thread segment are formed such that material is removed from the stab flank of the pin threads of the second thread segment to reduce the axial thickness of the threads relative to the axial thickness of the threads of the first segment,
   wherein the load flanks of the threads of the second thread segments is in full engagement with the mating flanks of the threads of the box member upon makeup of the connection,
   wherein the threads of the first thread segment comprises load flanks and stab flanks of a first constant pitch and the second thread segment comprises load flanks and stab flanks of a second constant pitch, the first constant pitch being equal to the pitch of the load flanks and stab flanks of the threads of the box member, and
   wherein the reduced axial thickness of the threads of the second thread segment of the pin member causes a gap to be formed between the stab flank of the pin threads and the adjacent flank of the box threads when the threads of the second thread segment are engaged with the corresponding mating threads of the box member upon make-up of the threaded connection;
   a machined land area in the outside diameter of the second tubular in the area adjacent an external shoulder of the pin member;
   a sleeve secured around the second tubular on the machined land area.

21. The expandable threaded tubular connection of claim 20 wherein the first thread segment comprises the portion of the pin member from the pin nose end to approximately the midpoint of the pin member.

22. The expandable threaded tubular connection of claim 21 wherein the second thread segment comprises the portion of the pin member from approximately the midpoint of the pin member to the external shoulder of the pin member.

23. The expandable threaded tubular connection of claim 22 wherein the gap allows radial and axial movement between the pin threads of the second thread segment and the corresponding mating box threads during radial expansion of the threaded connection.

24. The expandable threaded tubular connection of claim 23 wherein the axial thickness of the pin threads of the second thread segment is reduced by one-third.

25. The expandable threaded tubular connection of claim 23 wherein the axial thickness of the pin threads of the second thread segment is reduced by less than one-third.

26. The expandable threaded tubular connection of claim 23 wherein the axial thickness of the pin threads of the second thread segment is reduced by more than one-third.

27. The expandable threaded tubular connection of claim 20 wherein the outside diameter of the box member is greater than the outside diameter of the pin member.

28. The expandable Threaded tubular connection of claim 27 wherein the machined land area extends from the external shoulder of the pin member to a point on the second tubular that is two inches from the external shoulder.

29. The expandable threaded tubular connection of claim 27 wherein the machined land area extends from the external shoulder of the pin member to a point on the second tubular that is less than two inches from the external shoulder.

30. The expandable threaded tubular connection of claim 27 wherein the machined land area extends from the external shoulder of the pin member to a point on the second tubular that is greater than two inches from the external shoulder.

31. The expandable threaded tubular connection of claim 27 wherein the sleeve abuts the end of the box member upon make-up of the threaded connection.

32. The expandable threaded tubular connection of claim 20 wherein the sleeve is metal.

33. The expandable threaded tubular connection of claim 20 wherein the sleeve is a non-metallic maternal.

34. The expandable threaded tubular connection of claim 20 further comprising a radial metal-to-metal seal formed by the engagement of the box member with the pin member in the area of the first thread segment of the pin member upon make-up of the threaded connection.

35. The expandable threaded tubular connection of claim 34 further comprising a thread seal formed by the engagement of the box threads with the pin threads of the first thread segment upon make-up of the threaded connection.

36. The expandable threaded tubular connection of claim 35 further comprising a resilient sealing ring placed in a groove within the first thread segment, the resilient sealing ring forming a seal upon make-up of the threaded connection.

37. The expandable threaded tubular connection of claim 20 wherein the box member threads and the pin member threads are formed on pre-expanded ends of the first and second tubulars.

38. An expandable threaded tubular connection comprising:
  a first tubular segment with a pin member, the pin member comprising interengageable threads, the interengageable threads having a first thread segment and a second thread segment,
  a second tubular segment with a pin member, the pin member comprising interengageable threads, the interengageable threads having a first thread segment and a second thread segment;
  wherein the first and second thread segments of the pin members each comprise multiple turns of threads,
  wherein the first thread segments of the pin members each comprise load flanks and stab flanks of a first pitch, the first pitch being constant across the first thread segments of the pin members,
  wherein the second thread segments of the pin members each comprise load flanks and stab flanks of a second pitch, the second pitch being constant across the second thread segments of the pin members,
  wherein the threads of the second thread segments of each pin member are formed such that material is removed from the stab flank of the pin threads of the second thread segments to reduce the axial thickness of the threads relative to the axial thickness of the threads of the first segment;
  coupling member comprising box members on both ends of the coupling member, the box members having interengageable threads designed to engage the pin threads of the pin members of the first tubular and the second tubular upon make-up of the threaded connection,
  wherein the threads of the box members have load flanks and stab flanks of a constant pitch,
  wherein the load flanks of the threads of the first and second thread segments are in contact with the mating flanks of the threads of the box members upon makeup of the connection, and
  wherein the reduced axial thickness of the threads of the second thread segments of each pin member causes a gap to be formed between the stab flank of the pin threads and the adjacent flanks of the box threads when the threads of the second thread segments of each pin member are fully engaged with the corresponding mating threads of the box members of the coupling member upon make-up of the threaded connection.

39. The expandable threaded tubular connection of claim 38 wherein the first thread segments of each pin member comprise the portion of each pin member from the pin nose end to approximately the midpoint of the pin member.

40. The expandable threaded tubular connection of claim 39 wherein the second thread segments of each pin member comprise the portion of each pin member from approximately the midpoint of each pin member to an external shoulder of each pin member.

41. The expandable threaded tubular connection of claim 40 wherein the gap allows radial and axial movement between the pin threads of the second thread segments and the corresponding mating box threads during radial expansion of the threaded connection.

42. The expandable threaded tubular connection of claim 41 wherein the axial thickness of the pin threads of the second thread segments of each pin member is reduced by one-third.

43. The expandable threaded tubular connection of claim 41 wherein the axial thickness of the pin threads of the second thread segments of each pin member is reduced by less than one-third.

44. The expandable threaded tubular connection of claim 41 wherein the axial thickness of the pin threads of the second thread segments of each pin member is reduced by more than one-third.

45. The expandable threaded tubular connection of claim 38 further comprising a machined land area in the outside diameter of the first tubular in the area adjacent an external shoulder of the pin member of the first tubular.

46. The expandable threaded tubular connection of claim 45 wherein a sleeve is secured around the first tubular on the machined land area.

47. An expandable treaded tubular connection comprising:
  a first tubular segment with a box member, the box member comprising interengageable threads that have load flank and stab flanks of a constant pitch;
  a second tubular segment with a pin member, the pin member comprising interengageable threads for engaging said box member, the irterengageable threads of the pin member having a plurality of thread segments, the plurality of thread segments comprising multiple turns of threads;
  wherein one or more of the thread segments of the pin member comprise threads having a reduced axial thickness relative to the axial thickness of the threads of the box member,
  wherein the multiple turns of threads of the plurality of thread segments each have load flanks and stab flanks of a constant pitch, the pitch being equal to the pitch of the load flanks and stab flanks of the threads of the box member, and
  wherein the load flanks of the multiple turns of threads of the plurality of thread segments are in full engagement with the mating flanks of the threads of the box member upon makeup of the connection.

48. The expandable threaded tubular connection of claim 47 wherein the reduced axial thickness threads of the pin member causes a gap to be formed between the stab flank of the reduced axial thickness threads of the pin member and the adjacent flank of the box threads when the reduced axial thickness threads of the pin member are engaged with the corresponding mating threads of the box member upon make-up of the threaded connection.

49. The expandable threaded tubular connection of claim 48 wherein the gap allows radial and axial movement between the reduced axial thickness pin threads and the corresponding mating box threads during radial expansion of the threaded connection.

50. The expandable threaded tubular connection of claim 47 wherein the outside diameter of the box member is greater than the outside diameter of the pin member.

51. The expandable threaded tubular connection of claim 50 further comprising a machined land area in the outside diameter of the second tubular extending from an external shoulder of the pin member to a point on the second tubular that is approximately two inches from the external shoulder.

52. The expandable threaded tubular connection of claim 51 further comprising a sleeve secured around the second tubular on the machined land area, the sleeve having an outside diameter substantially equal to the outside diameter of the box member.

53. The expandable threaded tubular connection of claim 52 wherein the sleeve is metal.

54. The expandable threaded tabular connection of claim 52 wherein the sleeve is a non-metallic material.

55. An expandable threaded tubular connection comprising:
- a first tubular segment with a pin member, the pin member comprising interengageable threads that have load flanks and stab flanks of a constant pitch;
- a second tubular segment with a box member, the box member comprising interengageable threads for engaging said pin member, the interengageable threads of the box member having a plurality of thread segments comprising multiple turns of thread;
- wherein one or more of the tread segments of the box member comprises threads having a reduced axial thickness relative to the axial thickness of the threads of the pin member,
- wherein the multiple turns of threads of the plurality of thread segments each have load flanks and stab flanks of a constant pitch, the pitch being equal to the pitch of the load flanks and stab flanks of the threads of the pin member, and
- wherein the load flanks of the threads of the plurality of thread segments are in full engagement with the mating flanks of the treads of the pin member upon makeup of the connection.

56. The expandable threaded tubular connection of claim 55 wherein the reduced axial thickness threads of the box member cause a gap to be formed between the stab flank of the pin threads and the adjacent flank of the reduced axial thickness threads of the box member when the reduced axial thickness threads of the box member are engaged with the corresponding mating threads of the pin member upon make-up of the threaded connection.

57. The expandable threaded tubular connection of claim 56 wherein the gap allows radial and axial movement between the reduced axial thickness box threads and the corresponding mating pin threads during radial expansion of the threaded connection.

58. The expandable threaded tubular connection of claim 55 wherein the outside diameter of the box member is greater than the outside diameter of the pin member.

59. The expandable threaded tubular connection of claim 58 further comprising a machined land area in the outside diameter of the first tubular extending from an external shoulder of the pin member to a point on the first tubular that is approximately two inches from the external shoulder.

60. The expandable threaded tubular connection of claim 59 further comprising a sleeve secured around the first tubular on the machined land area, the sleeve having an outside diameter substantially equal to the outside diameter of the box member.

61. The expandable threaded tubular connection of claim 60 wherein the sleeve is metal.

62. The expandable threaded tubular connection of claim 60 wherein the sleeve is a non-metallic material.

* * * * *

UNITED STATES PATENT AND TRADEMARK OFFICE
CERTIFICATE OF CORRECTION

PATENT NO. : 7,452,007 B2
APPLICATION NO. : 10/885824
DATED : November 18, 2008
INVENTOR(S) : Ghazi J. Hashem, Lev M. Ring and John R. Setterberg, Jr.

It is certified that error appears in the above-identified patent and that said Letters Patent is hereby corrected as shown below:

In Claim 28:
    Column 10, line 35, "Threaded" should be changed to --threaded--.

In Claim 38:
    Column 11, line 31, add --a-- in front of the word "coupling".

In Claim 47:
    Column 12, line 16, delete "treaded" and insert --threaded--.

In Claim 54:
    Column 13, line 1, delete "tabular" and insert --tubular--.

In Claim 55:
    Column 13, line 13, delete "tread" and insert --thread--; and

Column 13, line 24, delete "treads" and insert --threads--.

Signed and Sealed this

Sixteenth Day of March, 2010

David J. Kappos
*Director of the United States Patent and Trademark Office*